(12) United States Patent
Xu et al.

(10) Patent No.: US 12,006,484 B2
(45) Date of Patent: Jun. 11, 2024

(54) METHOD AND SYSTEM FOR PREPARING FUEL BY USING HIGH ACID VALUE BIOLOGICAL OIL AND FAT

(71) Applicants: ECO Environmental Energy Research Institute Limited, Hong Kong (CN); Tianjin University, Tianjin (CN)

(72) Inventors: Bin Xu, Hong Kong (CN); Kam Shing Siu, Hong Kong (CN); Chunjian Xu, Tianjin (CN); Yongchao He, Tianjin (CN)

(73) Assignees: ECO Environmental Energy Research Institute Limited, Hong Kong (CN); Tianjin University, Tianjin (CN)

( * ) Notice: Subject to any disclaimer, the term of this patent is extended or adjusted under 35 U.S.C. 154(b) by 33 days.

(21) Appl. No.: 17/390,941

(22) Filed: Jul. 31, 2021

(65) Prior Publication Data

US 2021/0355393 A1    Nov. 18, 2021

Related U.S. Application Data

(63) Continuation of application No. PCT/CN2020/073766, filed on Jan. 22, 2020.

(30) Foreign Application Priority Data

Feb. 1, 2019   (CN) .......................... 201910104447.6
Feb. 1, 2019   (CN) .......................... 201920184673.5

(51) Int. Cl.
*C10L 1/02*         (2006.01)
*B01D 3/00*         (2006.01)
(Continued)

(52) U.S. Cl.
CPC .............. *C10L 1/026* (2013.01); *B01D 3/009* (2013.01); *B01D 3/10* (2013.01); *B01J 19/245* (2013.01);
(Continued)

(58) Field of Classification Search
CPC .... C10L 1/026; C10L 1/08; C10L 2200/0476; C10L 2200/0484; C10L 2290/02;
(Continued)

(56) References Cited

U.S. PATENT DOCUMENTS 8,581,013 B2    11/2013   Abhari et al.

FOREIGN PATENT DOCUMENTS

CN        102250634 A      11/2011
CN        102504866 A      6/2012
(Continued)

OTHER PUBLICATIONS

Extended European Search Report dated Sep. 19, 2022 in connection with EP Application No. 20749511.0, 8 pages.
(Continued)

*Primary Examiner* — Latosha Hines
(74) *Attorney, Agent, or Firm* — Baker & McKenzie LLP

(57) ABSTRACT

The present invention provides a method and a system for preparing fuel using high-acid-value biological grease, which can be processed through triple deoxidization steps, i.e., thermal cracking deoxygenation-catalytic cracking deoxygenation-catalytic hydrodeoxygenation. By use of the method and system of the invention, the raw material of the high-acid-value biological grease can be gradually deoxidized to reduce the acid value and thereby prepare a clean fuel with equivalent fuel components as those obtained from crude oil refining or direct hydrodeoxygenation for biological grease.

23 Claims, 1 Drawing Sheet

(51) Int. Cl.
  *B01D 3/10* (2006.01)
  *B01J 19/24* (2006.01)
  *C10G 3/00* (2006.01)
  *C10L 1/08* (2006.01)

(52) U.S. Cl.
  CPC .................. *C10G 3/40* (2013.01); *C10G 3/42* (2013.01); *C10G 3/50* (2013.01); *C10L 1/08* (2013.01); *B01J 2219/0004* (2013.01); *C10G 2300/1003* (2013.01); *C10G 2300/1014* (2013.01); *C10G 2300/202* (2013.01); *C10G 2300/207* (2013.01); *C10G 2300/301* (2013.01); *C10G 2300/302* (2013.01); *C10G 2300/308* (2013.01); *C10G 2300/4018* (2013.01); *C10G 2400/04* (2013.01); *C10L 2200/0476* (2013.01); *C10L 2200/0484* (2013.01); *C10L 2290/02* (2013.01); *C10L 2290/543* (2013.01)

(58) Field of Classification Search
  CPC ..... C10L 2290/543; B01D 3/009; B01D 3/10; B01D 3/143; B01J 19/245; B01J 2219/0004; B01J 2219/00051; B01J 2219/00162; B01J 2219/00166; B01J 3/006; B01J 6/008; C10G 2300/1003; C10G 2300/1011; C10G 2300/1014; C10G 2300/202; C10G 2300/207; C10G 2300/301; C10G 2300/302; C10G 2300/308; C10G 2300/4018; C10G 2400/04; C10G 3/40; C10G 3/42; C10G 3/49; C10G 3/50; C10G 7/06

See application file for complete search history.

(56) References Cited

FOREIGN PATENT DOCUMENTS

| | | |
|---|---|---|
| CN | 103059902 A | 4/2013 |
| CN | 103998574 A | 8/2014 |
| CN | 107974266 A | 5/2018 |
| CN | 109913256 A | 6/2019 |
| WO | 2008103204 A2 | 8/2008 |
| WO | WO-2013086762 A1 * | 6/2013 ............. C10G 11/05 |

OTHER PUBLICATIONS

International Search Report and Written Opinion dated Apr. 22, 2020 in connection with International Application No. PCT/CN2020/073766, 11 pages.

* cited by examiner

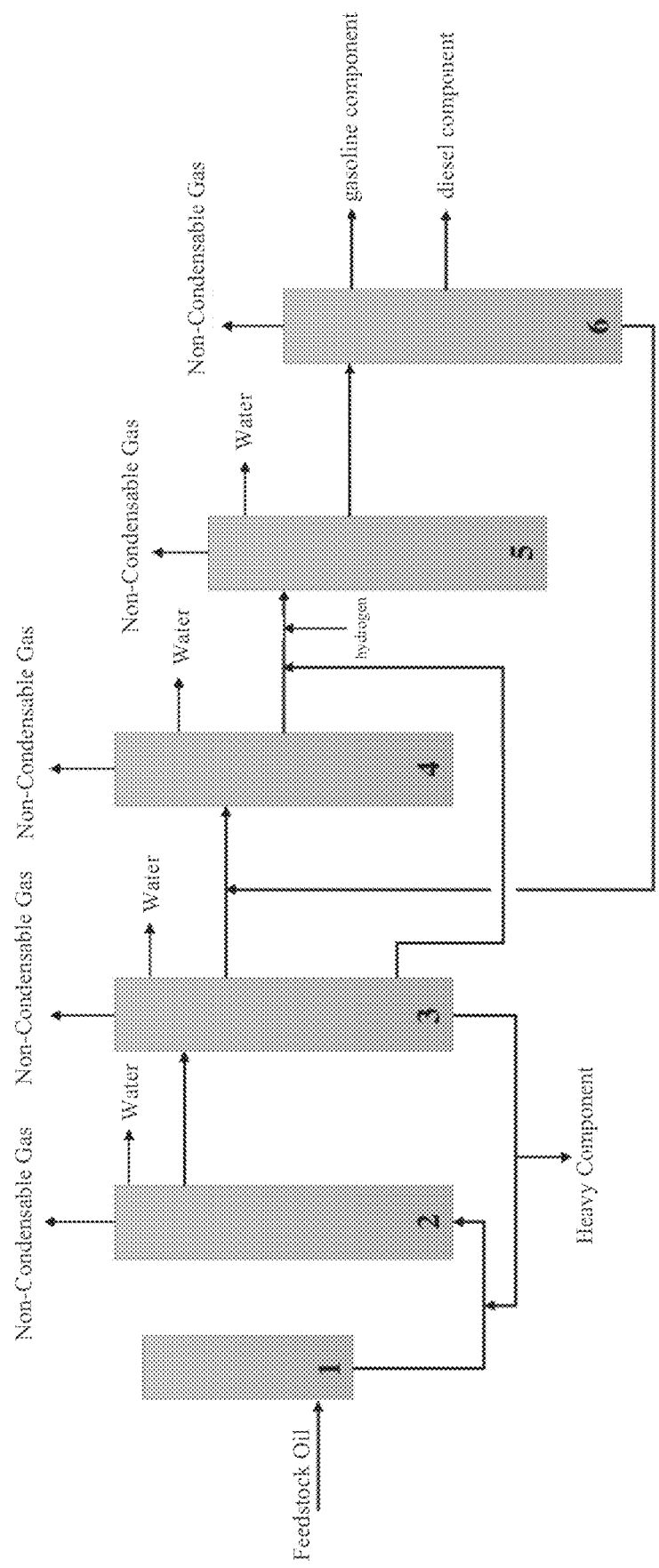

METHOD AND SYSTEM FOR PREPARING FUEL BY USING HIGH ACID VALUE BIOLOGICAL OIL AND FAT

CROSS-REFERENCE TO RELATED APPLICATIONS

This application is a continuation application of International Application No. PCT/CN2020/073766 filed Jan. 22, 2020, which claims priority to Chinese Application No. 201920184673.5 filed Feb. 1, 2019, and claims priority to Chinese Application No. 201910104447.6 filed Feb. 1, 2019, the contents of all of which are hereby expressly incorporated by reference in their entirety, including the contents and teachings of any references contained therein.

BACKGROUND

The present invention belongs to the technical field of energy regeneration, and particularly relates to a method and a system for preparing fuel using high-acid-value biological grease.

Regarding direct hydrogenation technology, WO 2009/039347 teaches a technique of producing diesel components from biorenewable feedstock in a two-step process of hydrodeoxygenation and hydroisomerization. US 2006/0207166 teaches a technique for simultaneous hydrodeoxygenation and hydroisomerization. A common drawback of these technologies lies in the poor stability of the catalysts, the high hydrogen consumption of the processes, and the corrosion problems of the equipments, especially in the problems generated in the processing of vegetable oils and animal fats with high oxygen content and high acid value.

In particular, direct hydrogenation technology is limited by the upper limit of free aliphatic acids in the feedstock. There has been a reference disclosing direct hydrorefining of 15%, the highest content in the art so far, free aliphatic acids to produce hydrocarbon fuels (Yanyong Liu et al., Chem. Lett. 2009, 38, 552).

At the same time, there are other technologies in the prior art for preparing biodiesel from biological grease. For example, US 2006/0186020 discloses a method for co-refining vegetable oil and crude oil, wherein the vegetable oil content is between 1% and 75%, but this method does not use the vegetable oil alone. Moreover, the problem of the co-refining is that the fluidity of the normal paraffin component produced in the hydrogenation process is poor at low temperature, which may affect the low-temperature performance of the final diesel product, and may affect the desulfurization and refining effect of the petrochemical diesel.

All in all, although there are many approaches and research results of processing and preparing fuels with high-acid-value biological grease as raw materials, problems such as low stability of catalyst, device corrosion, and high hydrogen consumption still exist in the prior art.

Meanwhile, there are other technologies for preparing biodiesel using biological grease in the prior art. For example, CN102492455A proposes a dual deoxidization technique for catalytic cracking deoxygenation-catalytic hydrodeoxygenation. This technology is limited by the unceasing change in the feedstock oil component. Once the feedstock component becomes heavier, the tower bottom of the catalytic cracking deoxidization column requires a higher temperature to ensure a certain overhead fraction yield, which however causes serious aggregation or coking problems of heavy oil in the tower bottom simultaneously.

SUMMARY

A series of simplified forms of concepts is introduced into the portion of Summary, which would be further illustrated in the portion of the detailed description. The Summary of the present invention does not mean attempting to define the key features and essential technical features of the claimed technical solution, let alone determining the protection scope thereof.

In order to overcome the above problems, the present invention provides a method of preparing fuel using high-acid-value biological grease. The method is preferably capable of producing a premium biomass fuel suitable as a diesel blending component which is comparable to the fuel component obtained from crude oil refining.

In particular, the present invention provides a method for preparing fuel using high-acid-value biological grease. With the high-acid-value biological grease as a raw material, the method comprises:
  (a) subjecting the high-acid-value biological grease to thermal cracking and deoxidization under heating conditions;
  (b) subjecting the product of step (a) to vacuum distillation to separate water, a high-acid-value fraction, a low-acid-value fraction and a heavy component;
  (c) catalytically cracking and deoxidizing the high-acid-value fraction obtained in the step (b) to separate water and non-condensable gas in the presence of a catalytic cracking deoxidization catalyst under heating conditions; and
  (d) catalytically hydrodeoxygenating a mixture of the product obtained in the step (c) and the low-acid-value fraction obtained in the step (b) with hydrogen in the presence of a hydrodeoxygenation catalyst under heating conditions.

To meet practical application requirements, the method may further comprise: (e) fractionating the product of step (d) to obtain a gasoline component, a diesel component and a heavy component of >365° C., wherein the heavy component of >365° C. is mixed with the high-acid-value fraction of step (b) as part of the raw material for the catalytic cracking deoxidization reaction.

According to another aspect of the present invention, there is provided a system for preparing fuel using high-acid-value biological grease, comprising:
  a thermal cracking reactor receiving high-acid-value biological grease, and causing the high-acid-value biological grease to undergo thermal cracking deoxidization reaction under heating conditions;
  a vacuum distillation column connected to the thermal cracking reactor, receiving a product obtained from thermal cracking deoxidization reaction and performing vacuum distillation to separate water, a high-acid-value fraction, a low-acid-value fraction and a heavy component;
  a catalytic cracking deoxidization reactor connected to the vacuum distillation column, catalytically cracking and deoxygenating the high-acid-value fraction obtained from vacuum distillation to separate water and non-condensable gas in the presence of a catalytic cracking deoxidization catalyst under heating conditions; and
  a hydrorefining reaction column receiving the product from the catalytic cracking deoxidization reactor and the low-acid-value fraction from the vacuum distillation column and mixing them, and performing catalytic and hydrodeoxygenation reaction with hydrogen in the presence of a hydrodeoxygenation catalyst under heating conditions.

To meet practical application requirements, the system may further comprise an atmospheric distillation column, connected to the hydrorefining reaction column, for fractionating the product of the hydrorefining reaction column. Still further, the system can also include a preheater, connected to the thermal cracking reactor, for preheating the high-acid-value biological grease entering the thermal cracking reactor.

The method and system according to the present invention processes the high-acid-value biological grease, preferably waste high-acid-value biological grease with triple deoxidization steps, i.e., thermal cracking deoxygenation-catalytic cracking deoxygenation-catalytic hydrodeoxygenation. In addition, the thermal cracking deoxygenation-catalytic cracking deoxygenation-catalytic hydrodeoxygenation in the present invention can be operated not only continuously, but also separately, i.e., continuously or intermittently, respectively, depending on the operating conditions in actual use. In the present invention, it is also possible to comprehensively utilize the generated waste residue and non-condensable gas for heating such that the entire production process becomes more energy-saving and environmentally friendly.

BRIEF DESCRIPTION OF THE DRAWINGS

The following drawings are hereby incorporated as part of the present invention for the understanding of the present invention. The drawings illustrate embodiments and description for explaining the principle of the present invention.

FIG. 1 illustrates an embodiment of a system in accordance with the present invention.

DESCRIPTIONS OF REFERENCE SIGNS OF MAIN COMPONENTS

1. Preheater
2. Thermal cracking reactor
3. Vacuum distillation column
4. Catalytic cracking deoxidization reactor
5. Hydrorefining reaction column
6. Atmospheric distillation column

DETAILED DESCRIPTION

In the following description, numerous specific details are set forth in order to provide a more thorough understanding of the present invention. However, it is obvious to those skilled in this art that the present invention may be implemented without one or more of these details. Some technical features well-known in this art are not described in other examples.

The pressures described herein are gauge pressures.

The present invention relates to a method for preparing fuel using high-acid-value biological grease, the method may comprise: (a) subjecting the high-acid-value biological grease to thermal cracking and deoxidization reaction under heating conditions;
  (b) subjecting the product of step (a) to vacuum distillation to separate water, a high-acid-value fraction, a low-acid-value fraction and a heavy component;
  (c) catalytically cracking and deoxidizing the high-acid-value fraction obtained in the step (b) in the presence of a catalytic cracking deoxidization catalyst under heating conditions to separate water and non-condensable gas; and
  (d) catalytically hydrodeoxygenating a mixture of the product obtained in the step (c) and the low-acid-value fraction obtained in the step (b) with hydrogen in the presence of a hydrodeoxygenation catalyst under heating conditions.

The present invention adopts a triple deoxidization process, i.e., a thermal cracking deoxidization-catalytic cracking deoxidization-catalytic hydrodeoxygenation. The technique of combining thermal cracking and vacuum distillation is used to treat the high-acid-value biological grease, which can remove some oxygen elements in the raw materials, reduce the acid values, density and viscosity of the raw materials, and separate the biological grease into water, the high-acid-value fraction and low-acid-value fraction, and the heavy component. The low-acid-value fraction can be directly used as one of the raw materials for the catalytic hydrodeoxygenation reaction, and the oxygen elements of the high-acid-value fraction can further be removed by catalytic cracking deoxidization reaction, thereby lowering its acid value to a lower level (e.g., <50 mgKOH/g). Finally, the remaining oxygen elements are removed by the catalytic hydrodeoxygenation reaction. Since hydrogen is not required in the steps of thermal cracking deoxidization and catalytic cracking deoxidization, and most of the oxygen elements are removed, the hydrogen consumption can be greatly reduced and the hydrogenation operating conditions are milder than direct hydrogenation for biological grease in the subsequent catalytic hydrodeoxygenation step.

In the step of thermal cracking and deoxidization, some aliphatic acids undergo reactions such as decarboxylation, degradation and isomerization at high temperatures to form alkanes and alkenes, ketones, water, $CO_2$, CO, hydrogen, methane, ethane, and the like, thereby reducing the acid value, density and viscosity, which is beneficial to the next treatment of the grease.

In the step of catalytic cracking deoxidization and acid value reduction, the remaining aliphatic acids in the high-acid-value fraction are partially deoxygenated by decarbonylation or decarboxylation to generate $CO_2$, CO, $H_2O$ and alkanes or alkenes. By this step can the acid value be lowered to a lower level (e.g., <50 mgKOH/g).

In the step of catalytic hydrodeoxygenation, the triglyceride is subjected to hydrogenation saturation, hydrodecarboxylation, hydrodecarbonylation and hydrodeoxygenation reactions to form normal paraffins. The hydrodeoxygenation reaction can further remove the oxygen-containing fraction which has not been removed in the foregoing process, and simultaneously saturate the olefin produced in the thermal cracking deoxidization-catalytic cracking deoxidization process to obtain a product with high stability.

The fuel prepared by the present invention is generally referred to as biomass fuel, meaning a solid, liquid, or gas composed or extracted from biomass, and the so-called biomass refers to a product of organic living or organic living metabolism. In a preferred embodiment, the biodiesel of the present invention is comparable to the components of petroleum diesel refined from petrochemical feedstock (e.g., crude oil), both of which are highly compatible, fully harmonizable, and blended to produce diesel fuel with equivalent property and scope of application to petroleum diesel.

According to a preferred embodiment of the present invention, the steps (a), (b) and (d) are operated continuously, and the step (c) is operated continuously or intermittently.

According to a preferred embodiment of the present invention, the intermittent operation of step (c) can employ a multi-distillation tank circulation reaction.

According to a preferred embodiment of the invention, the continuous operation of step (c) can employ a continuous catalytic distillation reaction.

The present invention is mainly based on three steps of thermal cracking deoxidization, catalytic cracking deoxidization and catalytic hydrodeoxygenation. The combination of the three steps is very flexible, and can not only be operated continuously, but also separately. Specifically, three reaction zones, a first reaction zone in which the thermal cracking deoxidization reaction (step (a)) and the reduced pressure distillation (step (b)) occurs, a second reaction zone in which the catalytic cracking deoxidization reaction (step (c)) occurs, and a third reaction zone in which the catalytic hydrodeoxygenation reaction (step (d)) occurs, can be operated continuously or intermittently, respectively, depending on the operating conditions of the actual application.

In industrial applications, both the thermal cracking deoxidization and vacuum distillation steps in the first reaction zone and the catalytic hydrodeoxygenation step in the third reaction zone are preferably operated continuously, with the advantages of stable reaction conditions and stable products. The catalytic cracking deoxidization step in the second reaction zone can be operated intermittently or continuously. For example, the catalytic cracking deoxidization step may be carried out by a multi-distillation tank circulation operation, or a continuous catalytic distillation operation. Preferably, the catalytic cracking deoxidization step employs a continuous catalytic distillation operation.

According to a preferred embodiment of the present invention, the high-acid-value biological grease can be of an animal origin, a plant source, a microbial source or a mixture of the foregoing. The high-acid-value biological grease can be waste high-acid-value biological grease. The high-acid-value biological grease may have an acid value of ≥80 mgKOH/g or a free fatty acid content of ≥40%. The free fatty acid is a fatty acid in a free state produced from biological grease.

Biological grease may include an animal source, a plant source, a microbial source or a mixture of the foregoing. Industrial or non-edible biological grease can be utilized. Biological grease is rich in triglycerides and free aliphatic acids. The fatty acid usually has a chain length of C12-C24, mostly C16 and C18. Examples of biological grease include, by way of example and not limitation, rapeseed oil, soybean oil, palm oil, sunflower oil, cottonseed oil, jatropha oil, olive oil, castor oil, microalgae oil, tallow, lard, butter, poultry fat, fish oil, and waste cooking oil. In one embodiment, vegetable oils and fats are preferred as the raw material.

According to a preferred embodiment of the present invention, the heating condition in step (a) may be from 100° C. to 600° C.

According to a preferred embodiment of the present invention, the high-acid-value biological grease in step (a) may be subjected to thermal cracking deoxidization for 1 to 60 minutes.

According to a preferred embodiment of the present invention, the products of step (a) may comprise olefins, alkanes, ketones, aliphatic acids, aliphatic alcohols, carbon monoxide, carbon dioxide, and water.

According to a preferred embodiment of the present invention, the high-acid-value fraction obtained in step (b) has an acid value in the range of 80 to 120 mgKOH/g, and the low-acid-value fraction has an acid value in the range of 10 to 50 mgKOH/g.

According to a preferred embodiment of the present invention, the products of step (b) may comprise water, a high-acid-value fraction, a low-acid-value fraction, a heavy component, carbon dioxide, and carbon monoxide.

According to a preferred embodiment of the present invention, the heavy component of step (b) can be treated as a waste material or mixed with a raw material as the raw material for step (a).

According to a preferred embodiment of the present invention, step (b) can be carried out at a pressure of −0.05 MPa to −0.3 MPa.

According to a preferred embodiment of the present invention, the vacuum distillation of step (b) can be carried out at a temperature ranging from 100° C. to 500° C.

According to a preferred embodiment of the present invention, the catalytic cracking deoxidization catalyst of step (c) may be selected from the group consisting of alumina, molecular sieves, silicon carbide or mixtures thereof.

According to a preferred embodiment of the present invention, step (c) can be carried out at a temperature ranging from 100° C. to 500° C.

According to a preferred embodiment of the present invention, step (d) can be carried out at a temperature ranging from 200° C. to 400° C., a hydrogen partial pressure of 1 MPa to 6 MPa, a volumetric space velocity of 0.5 h$^{-1}$ to 4.0 h$^{-1}$, and a hydrogen oil volume ratio of 200 to 1200:1.

According to a preferred embodiment of the present invention, the method of the invention may further comprise: (e) fractionating the product of step (d) to obtain a gasoline component, a diesel component and a heavy component of >365° C.

According to a preferred embodiment of the present invention, the heavy component of >365° C. can be mixed with the high-acid-value fraction of step (b) as part of the raw material for the catalytic cracking deoxidization reaction.

According to a preferred embodiment of the present invention, step (a) may further comprise a step of preheating the high-acid-value biological grease.

According to a preferred embodiment of the present invention, the hydrodeoxygenation catalyst is a supported metal catalyst or a metal sulfide.

According to a preferred embodiment of the present invention, the continuous catalytic distillation reaction separates water and non-condensable gas to obtain the fraction as the raw material for the catalytic hydrodeoxygenation reaction in step (d).

According to a preferred embodiment of the present invention, the product of step (c) has an acid value<50 mgKOH/g.

The present invention also relates to a system for preparing fuel using high-acid-value biological grease. It comprises: a thermal cracking reactor 2 receiving high-acid-value biological grease, and causing the high-acid-value biological grease to undergo thermal cracking deoxidization reaction under heating conditions; a vacuum distillation column 3 connected to the thermal cracking reactor 2, receiving a product obtained from thermal cracking deoxidization reaction and performing vacuum distillation to separate water, a high-acid-value fraction, a low-acid-value fraction and a heavy component; a catalytic cracking deoxidization reactor 4 connected to the vacuum distillation column 3, catalytically cracking and deoxygenating the high-acid-value fraction obtained from the vacuum distillation to separate water and non-condensable gas in the presence of the catalytic cracking deoxidization catalyst under heating conditions; a hydrorefining reaction column 5 connected to the catalytic cracking deoxidization reactor 4 and the vacuum distillation column 3, receiving the product from the catalytic cracking deoxidization reactor 4 and the low-acid-value fraction from the vacuum distillation column 3 and mixing them, and performing catalytic and hydrodeoxygenation reaction with hydrogen in the presence of a hydrodeoxygenation catalyst under heating conditions.

According to a preferred embodiment of the present invention, the catalytic cracking deoxidization reactor 4 may employ a multi-distillation tank or a catalytic distillation column. More preferably, the catalytic cracking deoxidization reactor 4 employs a catalytic distillation column. The high-acid-value fraction from the vacuum distillation column 3 is subjected to the catalytic cracking deoxidization reaction in the catalytic distillation column to obtain an overhead fraction and a tower bottom fraction with a lower level of the acid value (e.g., <50 mgKOH/g), which meets the requirement for the acid value of the feed in the subsequent catalytic hydrodeoxygenation step. In some cases, however, embodiments of the invention may also replace the catalytic distillation column with the multi-distillation tank.

According to a preferred embodiment of the present invention, the heating conditions in the thermal cracking reactor 2 may be from 100° C. to 600° C., and the residence time of the high-acid-value biological grease in the thermal cracking reactor 2 may be from 1 to 60 minutes.

According to a preferred embodiment of the present invention, the products of the thermal cracking reactor 2 may comprise olefins, alkanes, ketones, aliphatic acids, aliphatic alcohols, carbon monoxide, carbon dioxide, and water.

According to a preferred embodiment of the present invention, the high-acid-value fraction obtained from the vacuum distillation column 3 may have an acid value in the range of 80 to 120 mgKOH/g, and the low-acid-value fraction may have an acid value in the range of 10 to 50 mgKOH/g.

According to a preferred embodiment of the present invention, the products of the vacuum distillation column 3 may comprise water, a high-acid-value fraction, a low-acid-value fraction, a heavy component, carbon dioxide, carbon monoxide. Preferably, the heavy component may be treated as a waste material or mixed with a raw material as the raw material for the thermal cracking reactor 2.

According to a preferred embodiment of the present invention, the pressure in the vacuum distillation column 3 may be from −0.05 MPa to −0.3 MPa, and the temperature may be from 200° C. to 500° C.

According to a preferred embodiment of the present invention, the catalytic cracking deoxidization catalyst may be selected from the group consisting of alumina, molecular sieves, silicon carbide or mixtures thereof.

According to a preferred embodiment of the present invention, the catalytic cracking deoxidization reactor 4 may be heated at a temperature ranging from 100° C. to 500° C.

According to a preferred embodiment of the present invention, the hydrodeoxygenation catalyst may be a supported metal catalyst or a metal sulfide.

According to a preferred embodiment of the present invention, the hydrorefining reaction column 5 may have a heating condition of 200° C. to 400° C., a hydrogen partial pressure of 1 MPa to 6 MPa, a volumetric space velocity of 0.5 $h^{-1}$ to 4.0 $h^{-1}$, and a hydrogen oil volume ratio of 200 to 1200:1.

According to a preferred embodiment of the present invention, the system may further comprise an atmospheric distillation column 6 connected to the hydrorefining reaction column 5 for fractionating the product of the hydrorefining reaction column 6 to obtain a gasoline component, a diesel component and a heavy component>365° C.

According to a preferred embodiment of the present invention, the heavy component of >365° C. can be mixed with the high-acid-value fraction obtained from the vacuum distillation column 3 as part of the feed to the catalytic cracking deoxidization reactor 4.

According to a preferred embodiment of the present invention, the system may further comprise a preheater 1 connected to the thermal cracking reactor 2 for preheating the high-acid-value biological grease entering the thermal cracking reactor 2.

According to a preferred embodiment of the present invention, the product of the catalytic cracking deoxidization reactor 4 has an acid value of <50 mg KOH/g.

A specific embodiment of the system of the present invention will be further described in conjunction with FIG. 1.

After the high-acid-value biological grease is injected into the preheater 1 to carry out gasification, the thermal cracking deoxidization reaction is carried out in the thermal cracking reaction column 2. The product obtained in the thermal cracking reaction column 2 is then delivered to the vacuum distillation column 3 to carry out reduced pressure distillation. The separated products comprise water, a high-acid-value fraction, a low-acid-value fraction and a heavy component. The high-acid-value fraction obtained from vacuum distillation separation is injected into the catalytic cracking deoxidization reactor 4 where the catalytic deoxidization reaction is carried out. The low-acid-value fraction from the vacuum distillation column 3 and the product from the catalytic cracking deoxidization reactor 4 are then mixed with hydrogen and reacted in the hydrorefining reaction column 5 provided with the hydrodeoxygenation catalyst. Finally, the mixed fraction obtained by the hydrorefining reaction column 5 is delivered to the atmospheric distillation column 6 and fractionated to obtain a gasoline component, a diesel component, and a heavy component (>365° C.). The heavy component (>365° C.) can be mixed with the high-acid-value fraction from the vacuum distillation column 3 as part of the feed to the catalytic cracking deoxidization reactor 4.

The invention has the advantages that the acid value of the biological grease can be reduced to an operable level by a double deoxidization process, that is, thermal cracking deoxidization and catalytic cracking deoxidization. The hydrodeoxygenation reaction is then carried out, with mild reaction conditions (low hydrogen partial pressure and low reaction temperature). The catalyst has good stability and low hydrogen consumption, and can avoid corrosion problems of the device.

Example 1

Palm sludge oil is used as a raw material for the method of the invention.

The basic properties and distillation range of palm sludge oil are shown in Table 1. Palm sludge oil is a solid at room temperature and cannot be processed by direct hydrogenation techniques of the prior art due to the high-acid-value (as mentioned above, the prior art only teaches direct hydrorefining of up to 15% free aliphatic acids for production of hydrocarbon fuels). However, the palm sludge oil can be processed by use of the method of the present invention.

TABLE 1

Basic characteristics of palm sludge oil

| Test Items | Unit | Feedstock Oil |
|---|---|---|
| Density (20° C.) | kg/m³ | 898.8 |
| Motion Viscosity (50° C.) | mm²/s | 17.56 |
| Total Acid Value | mg KOH/g | 173.28 |
| Sulphur Content | mg/kg | 110 |
| Nitrogen Content | mg/kg | 580 |
| 50% Recovery Temperature | ° C. | 370 |
| 90% Recovery Temperature | ° C. | 442 |
| End Boiling Point | ° C. | 467 |

After the palm sludge oil is injected into the preheater to carry out gasification, the thermal cracking deoxidization reaction is carried out in the thermal cracking reaction column. The thermal cracking temperature is controlled between 100° C. and 600° C. With a certain amount of nitrogen introduced as the carrier gas, the tower top pressure is controlled between 0 and 2 Mpa, and the residence time of the oil in the reaction column is between 5 and 60 minutes. Next, the product obtained by the thermal cracking deoxidization is subjected to vacuum distillation to separate water, a high-acid-value fraction (80-120 mgKOH/g) and a low-acid-value fraction (10-50 mgKOH/g) according to the fraction temperature. The results are shown in Table 2.

TABLE 2

Product distribution under vacuum distillation after thermal cracking deoxidization reaction

| Water | High-acid-value Fraction 80-120 mgKOH/g | Low-acid-value Fraction 10-50 mgKOH/g | Heavy Component | Non-Condensable Gas |
|---|---|---|---|---|
| 4% | 71% | 18% | 2% | 5% |

It can be known from comparison of Table 1 and Table 2 that by the thermal cracking deoxidization and vacuum distillation steps of the method of the present invention, the oxygen contained in the feedstock oil can be removed in the form of water, thereby reducing the removal of oxygen during the subsequent treatment and prolonging the life of the catalytic cracking deoxidization catalyst and hydrodeoxygenation catalyst.

The high-acid-value fraction obtained from vacuum distillation separation is injected into the tower bottom of the catalytic distillation column, and is subjected to the catalytic cracking deoxidization reaction in the catalytic distillation column after heating and gasification. The tower bottom temperature of the catalytic distillation column is controlled between 100° C. to 600° C. The ratio of the catalytic cracking deoxidization catalyst to the feedstock oil is controlled between 1 and 20 (weight ratio). The ratio of the overhead fraction to the tower bottom fraction of the catalytic distillation column is shown in Table 3.

TABLE 3

Product distribution of catalytic cracking deoxidization

| Overhead Fraction | Tower Bottom Fraction | Water | Non-Condensable Gas |
|---|---|---|---|
| 70% | 24.2% | 1.8% | 4% |

Next, the low-acid-value fraction obtained from vacuum distillation separation and the overhead fraction and tower bottom fraction of the catalytic distillation column are mixed with hydrogen, and then reacted through a reaction column in which a hydrodeoxygenation catalyst is provided. A supported metal or metal sulfide is used as the hydrodeoxygenation catalyst. The remaining reaction conditions are shown in Table 4, and the composition analysis of the resultant clean fuel is shown in Table 5.

TABLE 4

Hydrodeoxygenation conditions

| Hydrogen Partial Pressure | MPa | 5.5 |
|---|---|---|
| Volumetric Space Velocity | h⁻¹ | 0.5 |
| Hydrogen Oil Volume Ratio | | 600 |
| Reaction Temperature | ° C. | 350 |
| Liquid Yield | % | 97 |

TABLE 5

Component analysis of clean fuel

| Appearance | | Transparent |
|---|---|---|
| Acid Value | mg/KOH/g | 0.43 |
| Density (20° C.) | kg/m³ | 780.0 |
| Distillation Range | | |
| Initial Boiling Point | ° C. | 126 |
| 10% Recovery Temperature | ° C. | 160 |
| 20% Recovery Temperature | ° C. | 187 |
| 30% Recovery Temperature | ° C. | 224 |
| 40% Recovery Temperature | ° C. | 249 |
| 50% Recovery Temperature | ° C. | 268 |
| 60% Recovery Temperature | ° C. | 288 |
| 70% Recovery Temperature | ° C. | 306 |
| 80% Recovery Temperature | ° C. | 331 |
| 90% Recovery Temperature | ° C. | 362 |
| End Boiling Point | ° C. | 374 |

As shown in Table 5, after the palm sludge oil undergoes the thermal cracking deoxidization and catalytic cracking deoxidization and then the hydrodeoxygenation treatment, the acid value of the obtained fraction is reduced to 0.43 mgKOH/g, which is much lower than the standard value of biodiesel standard (BD100) of China. The clean fuel obtained from palm sludge oil is indeed an excellent diesel blending component in accordance with the method of the present invention.

The present invention has been described by the above embodiments, but it is to be understood that the embodiments are for the purpose of illustration and explanation only, and are not intended to limit the present invention within the scope of the embodiments described herein. Furthermore, those skilled in the art can understand that the present invention is not limited to the above embodiments. Various variations and modifications can be made according to the teachings of the present invention. These variations and modifications may fall within the protection scope of the present invention as defined in the appended claims and their equivalents.

What is claimed is:

1. A method for preparing fuel using high-acid-value biological grease, comprising:
   (a) subjecting the high-acid-value biological grease to thermal cracking and deoxidization under a first set of heating conditions;
   (b) subjecting a product of step (a) to vacuum distillation to separate water, a high-acid-value fraction, a low-acid-value fraction and a heavy component;
   (c) catalytically cracking and deoxidizing the high-acid-value fraction obtained in the step (b) to separate water and non-condensable gas in the presence of a catalytic cracking deoxidization catalyst under a second set of heating conditions; and
   (d) catalytically hydrodeoxygenating a mixture of a product obtained in the step (c) and the low-acid-value fraction obtained in the step (b) with hydrogen in the presence of a hydrodeoxygenation catalyst under a third set of heating conditions.

2. The method according to claim 1, wherein the steps (a), (b) and (d) are operated continuously, and the step (c) is operated continuously or intermittently.

3. The method according to claim 2, wherein the intermittent operation of step (c) employs a multi-distillation tank circulation reaction.

4. The method according to claim 2, wherein the continuous operation of step (c) employs a continuous catalytic distillation reaction.

5. The method according to claim 1, wherein the high-acid-value biological grease is of an animal source, a plant source, a microbial source or a mixture of the foregoing.

6. The method according to claim 5, wherein the high-acid-value biological grease has an acid value of ≥80 mgKOH/g or a free fatty acid content of ≥40%.

7. The method according to claim 1, wherein the first set of heating conditions in step (a) is from 100° C. to 600° C.

8. The method according to claim 1, wherein the high-acid-value biological grease in step (a) is subjected to thermal cracking deoxidization for 1 to 60 minutes.

9. The method according to claim 1, wherein the products of step (a) comprise olefins, alkanes, ketones, aliphatic acids, aliphatic alcohols, carbon monoxide, carbon dioxide, and water.

10. The method according to claim 1, wherein the high-acid-value fraction obtained in step (b) has an acid value in the range of 80 to 120 mgKOH/g, and the low-acid-value fraction has an acid value in the range of 10 to 50 mgKOH/g.

11. The method according to claim 1, wherein the products of step (b) comprise water, a high-acid-value fraction, a low-acid-value fraction, a heavy component, carbon dioxide, and carbon monoxide.

12. The method according to claim 1, wherein the heavy component of step (b) can be treated as a waste material or mixed with a raw material as the raw material for step (a).

13. The method according to claim 1, wherein step (b) is carried out at a pressure of −0.05 MPa to −0.3 MPa.

14. The method according to claim 1, wherein step (b) is carried out at a temperature ranging from 100° C. to 500° C.

15. The process according to claim 1, wherein catalytic cracking deoxidization catalyst of step (c) is selected from the group consisting of alumina, molecular sieves, silicon carbide or mixtures thereof.

16. The method according to claim 1, wherein the second set of heating conditions in step (c) is carried out, at a temperature ranging from 100° C. to 500° C.

17. The method according to claim 1, wherein the third set of heating conditions in step (d) is carried out, at a temperature ranging from 200° C. to 400° C., a hydrogen partial pressure of 1 MPa to 6 MPa, a volume space velocity of 0.5 $h^{-1}$ to 4.0 $h^{-1}$, and a hydrogen oil volume ratio of 200 to 1200:1.

18. The method according to claim 1, further comprising:
   (e) fractionating a product of step (d) to obtain a gasoline component, a diesel component and a heavy component of >365° C.

19. The method according to claim 18, wherein the heavy component of >365° C. is mixed with the high-acid-value fraction of step (b) as part of the raw material for the catalytic cracking deoxidization reaction.

20. The method according to claim 1, wherein step (a) further comprises a step of preheating the high-acid-value biological grease.

21. The method according to claim 1, wherein the hydrodeoxygenation catalyst is a supported metal catalyst or metal sulfide.

22. The method according to claim 4, wherein the fraction obtained from the continuous catalytic distillation reaction of step (c) is used as a raw material for the catalytic hydrodeoxygenation reaction in step (d).

23. The method according to claim 1, wherein the product obtained in step (c) has an acid value of <50 mgKOH/g.

* * * * *